United States Patent [19]
Johnson et al.

[11] Patent Number: 5,373,892
[45] Date of Patent: Dec. 20, 1994

[54] DRY SUMP LUBRICATED INTERNAL COMBUSTION ENGINE WITH MODULAR COOLING SYSTEM

[75] Inventors: John L. Johnson, Brimfield; Roger A. Stapf, Dunlap, both of Ill.

[73] Assignee: Caterpillar Inc., Peoria, Ill.

[21] Appl. No.: 131,363

[22] Filed: Oct. 4, 1993

[51] Int. Cl.[5] .............................................. B60K 11/04
[52] U.S. Cl. ........................................ 165/41; 180/68.4
[58] Field of Search ................. 165/41, 44; 180/68.1, 180/68.4

[56] References Cited

U.S. PATENT DOCUMENTS

| | | | |
|---|---|---|---|
| 1,662,269 | 3/1928 | Howe . | |
| 2,095,058 | 10/1937 | Cross | 165/44 X |
| 2,165,909 | 7/1939 | Spiller | 184/6 |
| 2,311,069 | 2/1943 | Miller | 184/6 |
| 2,322,463 | 6/1943 | McDonald | 184/6 |
| 2,373,360 | 4/1945 | Walsh | 184/6 |
| 2,379,579 | 7/1945 | Hunter | 184/6 |
| 2,789,647 | 4/1957 | Couse | 180/53 |
| 2,874,804 | 2/1959 | Haas | 184/6 |
| 3,203,499 | 8/1965 | Bentz et al. | 180/68 |
| 3,554,322 | 1/1971 | Deutschmann et al. | 184/6 |
| 3,715,001 | 2/1973 | Wilson | 180/68 |
| 3,732,942 | 5/1973 | Hobbensiefken | 180/11 |
| 3,929,202 | 12/1975 | Hobbensiefken | 180/68 |
| 4,186,693 | 2/1980 | Thien et al. | 123/41.12 |
| 4,339,014 | 7/1982 | Berth et al. | 180/54 |
| 4,345,641 | 8/1982 | Hauser | 165/41 |
| 4,362,208 | 12/1982 | Hauser | 165/51 |
| 4,674,457 | 6/1987 | Berger et al. | 123/196 |
| 4,681,189 | 7/1987 | Krisiloff | 184/6.13 |
| 4,723,594 | 2/1988 | Koehr et al. | 180/68.4 X |
| 4,762,201 | 8/1988 | Malik | 184/6.13 |
| 5,046,550 | 9/1991 | Boll et al. | 165/41 |
| 5,101,936 | 4/1992 | Parades et al. | 184/6.13 |
| 5,172,752 | 12/1992 | Goetz, Jr. | 165/41 |
| 5,234,051 | 8/1993 | Weizinburger et al. | 165/41 |

Primary Examiner—John C. Fox
Attorney, Agent, or Firm—Diana L. Charlton

[57] ABSTRACT

The design of past vehicles having internal combustion engines has focused attention toward aerodynamic principles. However, present day vehicles have done little to reconfigure the vehicle's engine systems in order to enhance the aerodynamics of the vehicle. The present invention allows for enhancements of the aerodynamics of the vehicle by utilizing a dry sump means 60 within a dry sump lubricated engine 36 which eliminates a conventional oil pan and allows a replacing cover 46 to be smaller and more shallow thereby lowering the overall profile of the engine 36. The additional use of a separately mounted oil cooler 76 reduces the heat load to a radiator 80 thereby decreasing the necessary size for the radiator 80. The smaller radiator 80 decreases the vertical spatial requirements for the engine 36. By lowering the overall profile of the engine 36, with both the more shallow cover 46 and the smaller radiator 80, a vehicle hood 18 can be manufactured with an increased slope. The increased slope of the vehicle's hood 18 enhances the aerodynamics of the vehicle 12 by reducing air drag.

8 Claims, 3 Drawing Sheets

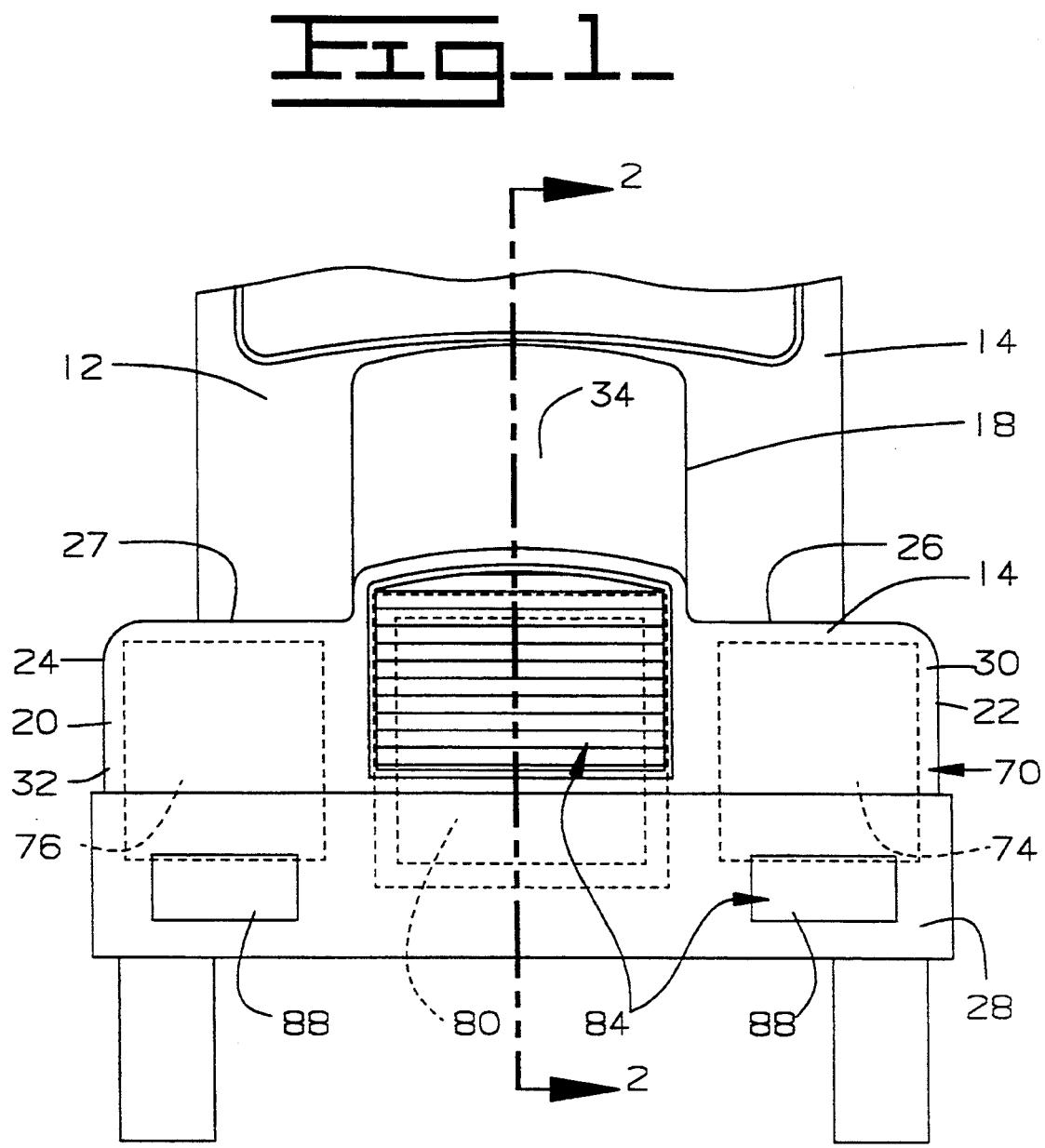

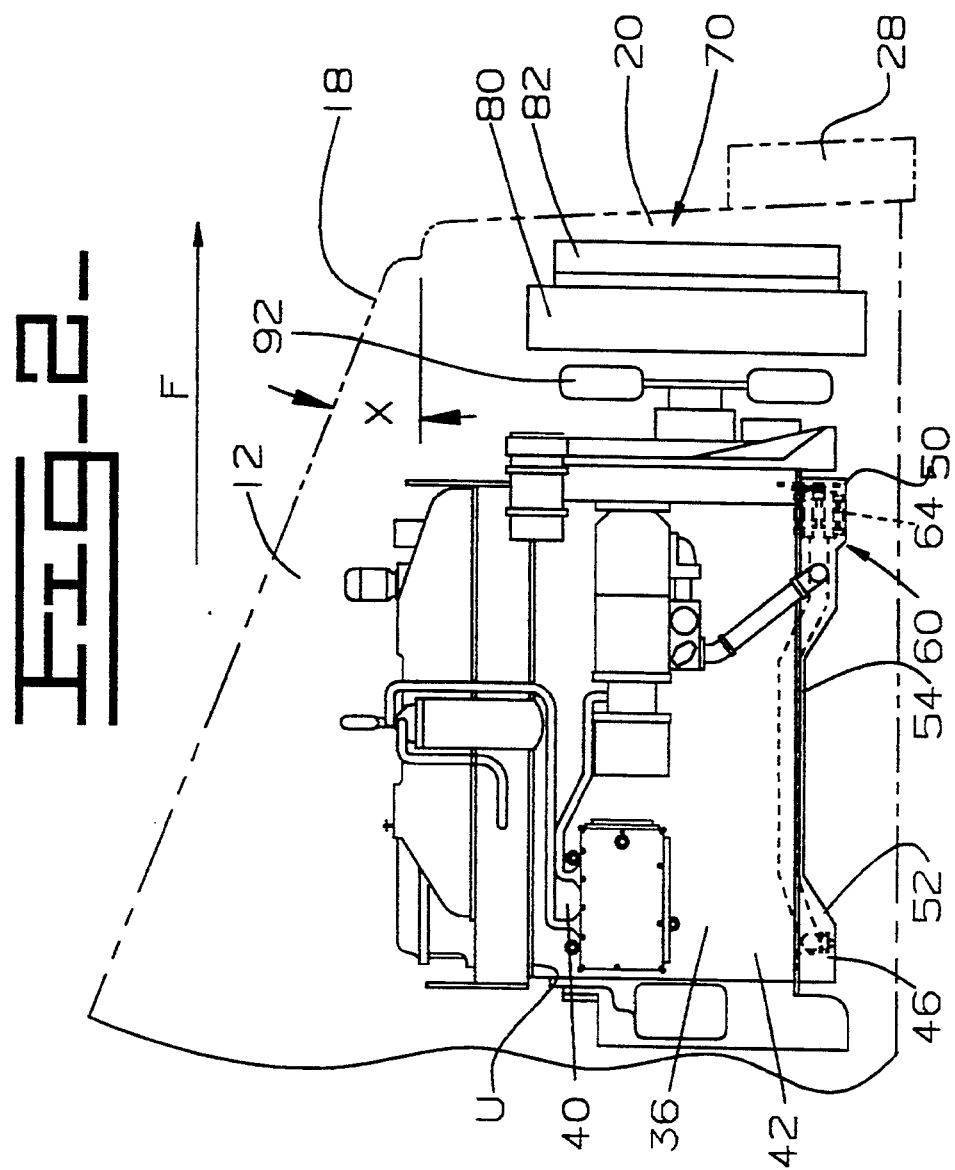

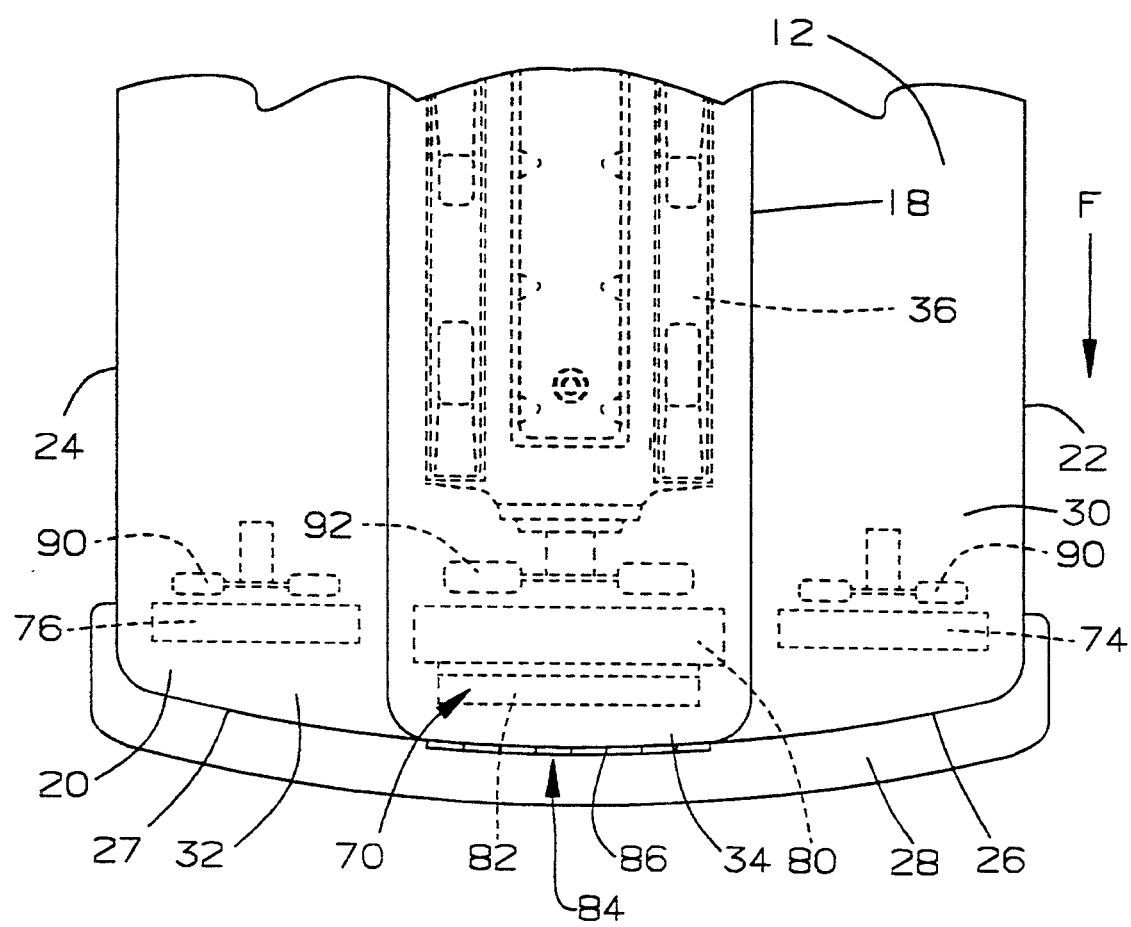
Fig_3

DRY SUMP LUBRICATED INTERNAL COMBUSTION ENGINE WITH MODULAR COOLING SYSTEM

TECHNICAL FIELD

This invention relates generally to a modular cooling system for use with a dry sump lubricated internal combustion engine and more particularly to the use of the cooling system along with the dry sump lubricated engine to enhance the aerodynamic shape of a vehicle.

BACKGROUND ART

Conventional vehicles having conventional internal combustion engines have been designed in the past with regard to aerodynamic principles. However, the front end of many conventional vehicles often are shaped in a square configuration which increases the air drag and lowers efficiency. Present day vehicles need to be aerodynamically designed so that vehicle air drag, and consequently, fuel consumption can be reduced. Unfortunately, little has been done to reconfigure the vehicle's engine in order to enhance the aerodynamic shape of the vehicle. One such design is disclosed in U.S. Pat. No. 3,929,202 issued to Dean W. Hobbensiefken on Dec. 30, 1975 wherein an engine assembly is mounted between the front and rear axles of a motor vehicle to allow the design of a particular cab configuration for reducing drag. The engine radiators are provided extending laterally outwardly of the rear wall of the cab for reducing the entrance of air into the gap between the cab and a trailer on the vehicle. Although the engine assembly has been moved to a location which allows the cab to be aerodynamically designed, no substantial improvements have been made to reduce the spatial requirements for the engine. Furthermore, the new location of the engine may be inconvenient for effective serviceability.

The present invention discloses a modular cooling system for use with a dry sump lubricated engine which is designed to reduce the spatial requirements of the system. The reduced spatial requirements of the cooling system along with the lower profile achieved with the dry sump lubricated engine increases allows for improved vehicle aerodynamics.

DISCLOSURE OF THE INVENTION

In one aspect of the present invention a heat exchanger arrangement is used in a vehicle which has an internal combustion engine and a hollow front end portion. The front end portion defines a pair of laterally spaced outer compartments and an engine compartment separate from and disposed between the spaced outer compartments in surrounding relationship to the engine. A first heat exchanger is disposed within one of the pair of outer compartments, a second heat exchanger is disposed within the other one of the pair of outer compartments, and a third heat exchanger is disposed within the engine compartment and is operatively associated with the engine. An inlet duct is located forwardly of each of the heat exchangers to allow communication of ambient air into each of the compartments. A fan is operatively associated with each of the compartments to force the ambient air through the heat exchangers.

The present invention enhances the aerodynamic shape of a vehicle by reducing the overall height, and thereby, the vertical spatial requirements of the heat exchanger arrangement. This is accomplished by arranging the heat exchangers such that they are disposed in three compartments laterally spaced from each other. By substantially distributing the work between the three heat exchangers, the heat exchangers may be manufactured smaller with less vertical spatial requirements.

BRIEF DESCRIPTION OF THE DRAWINGS

FIG. 1 is a partial front view of a vehicle having a dry sump lubricated internal combustion engine embodying the present invention.

FIG. 2 is a partial side view taken along line 2—2 of a vehicle having a dry sump lubricated internal combustion engine embodying the present invention.

FIG. 3 is a partial top plan view of a vehicle having a dry sump lubricated internal combustion engine embodying the present invention.

BEST MODE FOR CARRYING OUT THE INVENTION

A vehicle 12 having a cab portion 14 and embodying the present invention is shown in FIGS. 1-3. The cab portion 14 includes a hood 18 sloping rearwardly from the vertical at an angle x (see FIG. 2) and terminating at a hollow front end portion 20. The front end portion 20 has opposite vertical side walls 22,24 and horizontal walls 26,27 extending laterally inwardly of the upper edges of the side walls 22,24 to blendingly interconnect with the hood 18. The vertical side walls 22,24 terminate in a forward direction (F) at a vertical bumper panel 28 which extends transversely across the front of the cab portion 14 between the side walls 22,24. The front end portion 20 defines first and second laterally spaced outer compartments 30,32 located laterally inwardly from the side walls 22,24, respectively. The front end portion 20 further defines an engine compartment 34 separated from and disposed between the spaced outer compartments 30,32 and located substantially beneath the hood 18. An internal combustion engine 36 is mounted within the engine compartment 34 in a conventional manner.

The engine 36, shown more specifically in FIG. 2, is a dry sump lubricating type and includes a block 40 which has an upper surface (U) whereon a cylinder head (not shown) is conventionally connected and a lower surface (L) opposite the upper surface (U). The block 40 includes a crankcase portion 42 wherein a crankshaft (not shown) is mounted in a conventional manner. An oil pump (not shown) is mounted on the engine 36 and is driven in any suitable manner. A remotely mounted oil reservoir (not shown) may be mounted on the engine 36 or in any convenient location on the vehicle 12. A cover 46 is releasably connected to the lower surface (L) of the block 40. The cover 46 has a forward portion 50 and a rearward portion 52 which act as oil collection areas. An intermediate flat portion 54 of the cover 46 is located between the forward and rearward portions 50,52. The portions 50,52,54 are fluidly connected to the crankcase portion 42. A dry sump means 60 of any suitable type is operatively associated with the engine 30 for returning lubricating oil to the remote oil reservoir. The dry sump means 60 includes a scavenge pump 64 with an integral forward intake (not shown) located within the forward portion 50. The scavenge pump 64 is fluidly connected to the rearward portion 52 and to the oil reservoir (not shown) in any suitable manner.

A heat exchanger arrangement 70 for use in the vehicle 12 is shown in FIGS. 1–3. The heat exchanger arrangement 70 includes a air conditioning core 74 mounted in any suitable manner within the first outer compartment 30 and a oil cooler core 76 mounted in any suitable manner within the second outer compartment. A radiator and an aftercooler core 80,82, respectively, are mounted in any suitable manner within the engine compartment 34. The radiator and the aftercooler cores 80,82 have a predetermined height along with the low profile dry sump lubricated engine 36 that allow for the hood 18 to slope at an angle x relative to a horizontal reference. The air conditioning core 74 and the oil cooler core 76 have a predetermined height less than the height of the radiator core 80. The oil cooler core 76 is fluidly connected to the dry sump means 60 for receiving lubricant from the oil collection areas in the front and rear portion 50,52 of the cover 46.

An air inlet means 84 which includes a louvered grill 86 extending transversely across the front of the engine compartment 34 located forwardly of the heat exchangers 80,82 for communicating ambient air into the compartment 34. The air inlet opening 84 for the outer compartments 30,32 includes a pair of slots 88 integrally formed with the vertical bumper panel 28. A fan 90 of any conventional type is mounted in any suitable manner within each of the outer compartments 30,32 and is located rearwardly of the air conditioning core and the oil cooler core 74,76, respectively, to force the ambient air through the heat exchangers 74,76. A conventional engine driven fan 92 is drivingly connected with the engine 36 within the engine compartment 34 and is located rearwardly of the radiator core and aftercooler core 80,82, respectively, to force the ambient air through the heat exchangers 80,82.

Industrial Applicability

In use, the dry sump lubricated engine 36 includes the dry sump means 60 which draws the oil from the forward and rearward portions 50,52 of the cover 46 and delivers the oil to the oil reservoir (not shown). Oil is circulated through the engine 36 from the remote oil reservoir (not shown) via the oil pump (not shown) in order to lubricate and cool various engine components during operation of the engine 36. During this circulation, heat is absorbed by the oil and the oil is subsequently cooled as it passes from the engine 36 into the oil cooler 76. The oil is returned to the remote oil reservoir (not shown) where the lubrication process continues.

Due to the utilization of a dry sump lubricated engine 36, the remotely located oil reservoir (not shown) holds the majority of the oil passing through the engine 36 thereby eliminating the need for a conventional oil pan. The conventional oil pan is replaced by the more shallow cover 46 which has a reduced depth. The smaller, more shallow cover 46 lowers the overall height of the engine 36 thereby lowering the profile of the engine 36.

Removing the oil cooling function from the radiator 80 by cooling the oil through use of the separate oil cooler 76 reduces the heat load to the radiator 80 and the aftercooler 82. By reducing the heat load to the radiator 80 and the aftercooler 82, the size of the heat exchangers 80,82 can be reduced such as by lowering the vertical height. The ability to reduce the size of the radiator and aftercooler 80,82 and to arrange the heat exchangers 74,76,80,82 in compartments 30,32,34 within the front end portion 20 produces a more modular cooling system.

Lowering the vertical height of the radiator 80 and the aftercooler 82 in addition to lowering the overall profile of the engine through the use of dry sump lubrication maximizes the angle at which the hood 18 of the vehicle 12 can be sloped. The increased slope (angle x) of the hood 18 increases the aerodynamics of the vehicle 12 by reducing air drag.

In view of the above, it is apparent that the present invention utilizes a dry sump lubricated internal combustion engine which lowers the overall profile or vertical spatial requirements of the engine by utilizing a separately mounted oil cooler. The use of the oil cooler reduces the heat load to the existing radiator thereby allowing for a smaller sized radiator. The ability to lower the overall height of the engine through the use of the dry sump means and the smaller radiator size provides for an increased slope of the hood on the vehicle. The increased slope of the hood increases the aerodynamics of the vehicle thereby reducing fuel consumption.

We claim:

1. A heat exchanger arrangement (70) for use in a vehicle (12), the vehicle (12) having an internal combustion engine (36) and a hollow front end portion (20), comprising:

the front end portion (20) defining a pair of laterally spaced outer compartments (30,32) and an engine compartment (34) separate from and disposed between the spaced outer compartments (30,32) in surrounding relationship to the engine (36);

a first heat exchanger (74) disposed within one of the pair of outer compartments (30);

a second heat exchanger (76) disposed within the other one of the pair of outer compartments (32);

a third heat exchanger (80) disposed within the engine compartment (34) and being operatively associated with the engine (36);

air inlet means (84) located forwardly of each of the heat exchangers (74,76,80) for communicating ambient air into each of the compartments (30,32,34); and a plurality of fans (90,92) each operatively associated with one of the compartments (30,32,34) force the ambient air through the heat exchangers (74,76,80).

2. The heat exchanger arrangement (70) of claim 1, wherein the internal combustion engine (36) is a dry sump lubricated engine.

3. The heat exchanger arrangement (70) of claim 2, wherein the third heat exchanger (80) has a predetermined height and the first and second heat exchanger (74,76) each have a predetermined height less than the height of the third heat exchanger (80).

4. The heat exchanger arrangement (70) of claim 3, wherein the third heat exchanger (80) is positioned laterally with respect to the first and the second heat exchangers (74,76).

5. The heat exchanger arrangement (70) of claim 4, wherein the air inlet (84) is located in front of each of the heat exchangers (74,76,80).

6. The heat exchanger arrangement (70) of claim 5, wherein the fans (90,92) are each located in a respective one of the compartments (30,32,34).

7. The heat exchanger arrangement (70) of claim 1, wherein the engine (36) includes a crankcase portion (42), a relatively shallow cover (46) releasably connected to the crankcase (42), and a dry sump means (60)

operatively associated with the cover (46) and the crankcase (42) for scavenging lubricant from the cover (46).

8. The heat exchanger arrangement (70) of claim 7, wherein the cover (46) includes a forward portion (50), a rearward portion (52), and an intermediate flat portion (54) with each of the portions (50,52,54) being in fluid communication with the crankcase (42).

* * * * *